INVENTOR
DENIS CLEAVER
Chisholm and Spencer
ATTORNEYS

United States Patent Office 3,438,720
Patented Apr. 15, 1969

3,438,720
OXIDES
Denis Cleaver, Saltburn, England, assignor to British Titan Products Company Limited, Billingham, England, a corporation of Great Britain
Filed Jan. 11, 1966, Ser. No. 520,006
Claims priority, application Great Britain, Jan. 18, 1965, 2,135/65
Int. Cl. C01b *13/14;* B01j *1/14;* H05h *1/00*
U.S. Cl. 23—1                                14 Claims

ABSTRACT OF THE DISCLOSURE

In the production of metal or metalloid oxides by the vapor phase oxidation of a corresponding halide with an oxygenating gas in which a plasma-heated gas is provided in a reaction zone, a significant problem exists with regard to wall deposition and encrustation in the reaction zone. While this problem is particularly serious in all such plasma-heated reactions, it is particularly serious when the plasma is formed in the reaction zone since the encrustation significantly alters the induction characterstcis. By the transpiration of a suitable fluid through an internal fluid-permeable barrier, wall encrustation can be susbtantially eliminated or minimized. Both apparatus and process are claimed.

---

This invention relates to a process for the production of metal or metalloid oxides by the vapour phase reaction of metal or metalloid halides with oxygenating gas.

In our co-pending application No. 256,386 now abandoned a method is descrbied for the production of metal or metalloid oxides by the vapour phase oxidation of a metal or metalloid halide with an oxygenating gas, there being introduced into the reaction zone a gas which may have been heated by passage through an electric arc.

The metal or metalloid oxides which are most particularly contemplated are titanium dioxide, alumina, silica and zirconia.

It has been discovered that during the process part of the metal or metalloid oxide produced may be deposited on the wall of the reactor in the form of an encrustation which can be hard and difficult to dislodge. Apart from the fact that the formation of such an encrustation represents a waste of the metal or metalloid oxide therein, the encrustation may hinder or make impossible the satisfactory working of the process over a period of time. For example, the encrustation may build up to such an extent as to block the reactor. Another danger is that in the method where the reaction zone is within the field produced by the high frequency induction coil, although the wall of the reactor is normally at a much lower temperature than would cause it to fail, the encrustation of metal or metalloid oxide thereon may be dielectrically heated to such a temperature that it becomes extremely hot and fuses into the wall of the reactor, eventually destroying the wall.

It is an object of this invention to provide means for reducing or preventing the encrustation described above.

This invention provides a process for the production of a metal or metalloid oxide by oxidising a metal or metalloid halide in the vapour phase with an oxygenating gas in a reaction zone having a porous wall, comprising heating an inert gas or one or both of the reactants at least to the temperature of the oxidation by means of a radio-frequency induced plasma, maintaining the temperature of the oxidation in the reaction zone at least in part by means of such heated gas contained therein, and effecting the oxidation while transpiring a further gas or vaporisable liquid (as herein defined) through the porous wall into the reaction zone, whereby the deposition of solid products of the oxidation reaction on the wall is inhibited or prevented.

The temperature of the reaction zone is desirably at least 700° C., especially at least 900° C. The temperature to which the inert gas or one or both of the reactants is heated by means of the plasma may be the same as or higher than that of the actual oxidation reaction; it will be particularly desirable for it to be higher if the plasma is not in the reaction zone.

The further gas or vaporisable liquid (hereinafter called "the transpired gas") may be any gas or vaporisable liquid which will transpire through the pores of the porous wall and which will not adversely affect the oxidation reaction or its products. An example of a suitable transpired gas is an inert gas, e.g. nitrogen. It may be desirable to use as transpired gas a gas which will not make it more difficult to recover from the effluent gas the halogen liberated by the oxidation reaction, so as to allow such halogen to be used to prepare fresh supplies of the metal or metalloid halide. In such a case, the transpired gas may desirably be the same gas as the halogen of the metal or metalloid halide. Thus, if the metal or metalloid halide is a chloride, it may be desirable to use chlorine as the transpired gas, and this chlorine may particularly desirably be in the form of the effluent gas from the reaction zone after it has been cooled and separated from the solid reaction product.

The porous wall may be formed of any suitable resistant material; fritted silica has been found satisfactory. The porosity must be such as to provide a multitude of paths for the transpired gas and degree of porosity of the walls is important. If the pore size is too large and particularly if it is not substantially uniform the transpired gas will follow a number of preferential paths of least resistance and will not prevent deposition of solids over the whole area of the wall. Consequently for any given gas flow the pore size must be such as to give a substantial pressure drop across the wall and thus assist even distribution of the transpired gas.

The plasma may be produced by an induction coil which may be wound either as a single layer solenoid or as a spiral pancake (single plane) winding. The coil may be located around the reaction zone itself or at a place such that the gas to be heated passes through the plasma shortly before entering the reaction zone. The coil may be constructed of metal and normally consists of a copper tube which can be cooled by the passage of a fluid such as water through the tube. It is possible to preheat one of the reactants, preferably the oxygenating gas, by passing it through the tube so as to effect the cooling of the tube.

One method of working with the coil around the reaction zone is to use a double walled reactor, the inner wall being porous. The coil may be wound round the outer wall but it is preferred that it should be located between the two walls and adjacent the inner porous wall. The transpired gas may be introduced into the space between the two walls so that it then transpires through the porous wall into the reaction zone.

It is clear from what has just been stated that a preferred apparatus according to the invention comprises a reactor having a reaction zone surrounded by a double wall of which the inner wall is porous, means for introducing a gas or vaporisable liquid into the space between the two walls for transpiry through the porous wall into the reaction zone, means for the introduction of a metal or me'alloid halide and an oxygenating gas into the reaction zone, and an induction coil located between the two walls for forming a radio-frequency induced plasma so as to maintain an elevated temperature in the reaction zone.

The transpired gas may be liable to corrode the coil if it is a corrosive gas (such as chlorine) and if the coil is made of some material which is fairly easily attacked (such as copper) it may be desirable to shield the coil from the transpired gas, for example by enclosing the coil in a coil of hollow silica ware.

However, this shielding of the coil may not always be necessary, particularly if the transpired gas is relatively cool. For example, it has been found that a copper coil may not need to be shielded from the transpired gas even if the latter is chlorine, provided that the chlorine is relatively cool.

The gas to be heated by the plasma may conveniently be one of the reactants, for example the oxygenating gas, but it may be (or include) another gas, for example an inert gas such as argon.

The stability of the plasma is affected by the method of introduction of the gas or gases to be heated. Tangential injection of the whole or part of the gas at one end of the vessel containing the plasma creates a helical flow which effectively stabilises the plasma and simultaneously cools the wall of the vessel. Sheath flow, in which part of the gas is made to travel in an axial direction as a thin high velocity sheath adjacent the inside wall of the vessel, is also an effective method of stabilising the plasma.

If the gas is passed fairly rapidly through the plasma, it may tend to displace the plasma downstream of its normal position. In order to minimise this effect, the coil forming the plasma may be provided with a reverse turn at its downstream end so as to confine the plasma magnetically.

Even more desirable than the downstream reverse turn may be a reverse turn at the upstream end of the coil. Without this upstream reverse turn there may be a danger of the gas injection head becoming heated to such an extent as to cause it to melt. The upstream reverse turn tends magnetically to prevent eddy currents induced by the coil extending to such inlet.

In the method where the reaction zone is within the field produced by the radio-frequency induction coil and this coil is wound round the outer wall, the ratio of the amount of gases being injected into the reaction zone to the amount of transpired gas may range from 1:10 to 10:1 by volume and is preferably about 1:1. As the ratio falls below this (i.e. with an excess of transpired gas), there is a danger that the plasma discharge may go out or extend to the space outside the transpired wall. At ratios greater than 1:1 the plasma is normally stable, but of course there must be sufficient transpired gas to inhibit or prevent deposit of solid reaction products on the porous wall.

It is preferred that the coil should be located between the two walls adjacent the inner porous wall which eliminates these difficulties and the only requirement is that there must be sufficient transpired gas to inhibit or prevent the deposit of solid reaction products. In addition to its effect in inhibiting or preventing deposit of solid reaction products, the transpired gas has a further useful effect of cooling the porous wall through which it is transpired, and it may be desirable to sub-divide the space between the walls into several zones along the axis of the reactor and to use different transpiration rates in the several zones so as to accommodate the different levels of heat flux.

The effluent gas from the reaction zone may be cooled and the metal or metalloid oxide entrained therein may then be collected.

The effluent gas cooler may be some form of conventional heat exchanger and cooling can be assisted by the injection of a cold gas. The degree of cooling required depends on the type of equipment used to collect the oxide from the gas, but any desired degree of cooling can be obtained by the injection of the right amount of cold gas. The cold gas is preferably some of the effluent gas which issued earlier from the reaction zone and which has already been cooled.

The metal or metalloid oxide can be separated from the cooled effluent gas by any desired means, for example fabric filters, cyclones or electro-static precipitation.

If the plasma is formed in the reaction zone itself, the characteriistics of the plasma may have an effect on the particle size of the metal or metalloid oxide. The temperature gradient after the reaction gases have left the plasma can be of some importance. Thus, quick cooling of the gas stream immediately it has left the plasma may favour the production of very small particles. If somewhat less small particles are desired, it may be advantageous to cool the gas stream relatively slowly so as to favour residual reaction leading to a building-up of the particle size. Another controlling feature is the velocity with which the gas stream leaves the plasma, and this can be suitably regulated.

It has been found desirable to construct the reactor head (i.e. the assembly for the introduction of the gas to the reactor) of an electrically insulating material. Teflon may be satisfactory. Metal construction is not normally preferred.

When starting up the process, one may initiate the plasma by first employing a low power and a low flow rate of the gas to be heated and then raising these simultaneously to the working values. Preferably the plasma is initiated by admitting an easily ionisable gas such as argon to the reactor and after initiation transferring to the required gas.

The accompanying drawing shows two types of apparatus that may be used in accordance with the present invention.

Figure 1:
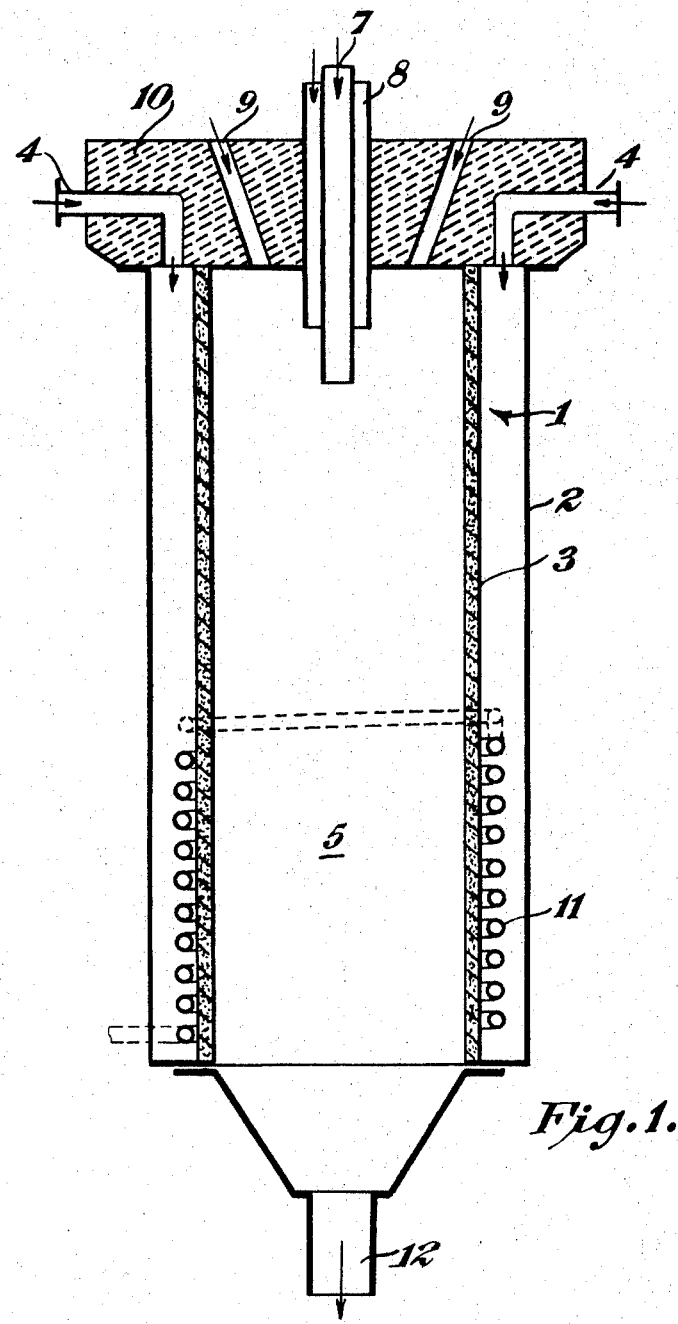
FIGURE 1 is a diagrammatic section of a reactor and its reactor head.

In FIGURE 1, the reactor 1 comprises two concentric walls 2 and 3, the inner wall 3 being porous. A transpired gas may be fed into the space between the walls 2 and 3 by means of inlets 4 so that it may then be transpired through the wall 3 into the reaction zone 5. A gas to be heated may be injected through inlet 7, while a metal or metalloid halide may be injected through inlets 8 and an oxygenating gas through inlets 9. The inlets 4, 7, 8 and 9 all pass through a reactor head 10. A coil 11 is located in the space between walls 2 and 3 so as to be able to generate a plasma in the reaction zone 5. Effluent gases from the reaction zone 5 may leave the reaction vessel through outlet 12. The coil consists of ten turns of a water cooled copper tube with a reverse turn of the coil at the upstream end.

Figure 2:
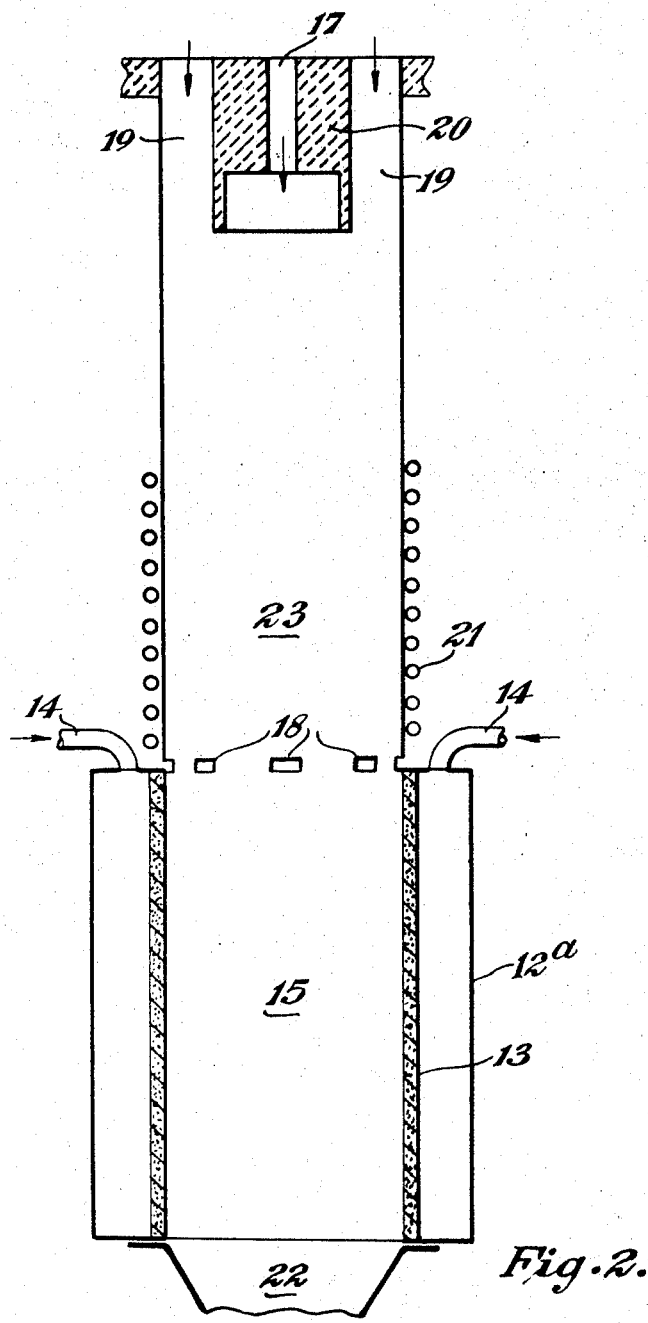
FIGURE 2 is a diagrammatic section of another reactor.

In FIGURE 2 a reaction vessel has concentric walls 12a and 13, the inner wall being porous. A transpired gas may be introduced into the space between the walls 12a and 13 through the inlets 14 so that it may be transpired into reaction zone 15. Metal or metalloid halides may be introduced into the reaction zone 15 through inlet slots 18. Inlets 17 and 19 are formed in the reactor head 20. Gas may be introduced through inlet 17 and annular inlet 19, the gas introduced through inlet 19 flowing as a sheath along the inner wall. One or both of these gases is or are the gas to be heated and/or the oxygenating gas. A coil 21 is located as shown so that it can form a plasma in the space 23 above the reaction zone 15; the plasma heats the gas to be heated before the latter reaches the reaction zone 15. The reactor outlet is shown at 22.

The invention is illustrated by the following examples:

EXAMPLE 1

The apparatus of FIGURE 1 was used, the coil 11 being connected to a source of radio-frequency energy of 4 megacycles per second. The plasma was initiated by passing current through the coil 11 and inserting a metal rod through inlet 7 into the coil field. The metal rod was rapidly heated to a very high temperature and energised argon gas previously admitted into reaction zone 5. The rod was withdrawn and argon was admitted through inlet 7 at a rate of 0.25 mole/min. with increasing power being fed through the coil. When the plasma had been thus initiated, oxygen at a rate of 1.5 moles/min. was introduced through inlets 9 and the current was again increased. Titanium tetrachloride was then fed at a rate of 1 mole/min. through inlet 8 and chlorine was fed through inlets 4 to the gas permeable reactor wall 3 at a rate of 3 moles/min. Once the reaction proper had been initiated, the flow of argon was stopped and the power again increased. Reaction continued at a steady rate and there was no build up of pressure to the chlorine feed indicating that there was no serious growth of titanium dioxide pigment on the reactor fall 3. The product issuing from outlet 12 was collected in a conventional manner and the titanium dioxide recovered.

EXAMPLE 2

The apparatus of FIGURE 2 was used, the coil 21 being connected to a source of radio-frequency energy of 4 megacycles per second. The plasma was first initiated in a similar manner to that described in Example 1, and once it had been established the power was increased and oxygen was fed at a rate of 10 litres/min. through inlet 17 and vortex oxygen through inlet 19 at a rate of 60 litres/min. The oxygen plasma was thus established. Titanium tetrachloride was then fed through the feed slots 18 initially at a rate of ¾ mole/min., while chlorine was fed through inlets 14 to the space between the walls 12a and 13 at a rate of 3 moles/min. As reaction proceeded the flow of titanium tetrachloride vapour gas gradually increased to a rate of 1¼ moles/min. without disturbing the plasma operation. There was substantially no growth of titanium dioxide on the reactor wall 13. The product was collected as in Example 1.

What I claim is:

1. In the production of an oxide selected from the group consisting of metal oxides and metalloid oxides by a process comprising the vapor phase reaction in a reaction zone of an oxygenating gas with a halide corresponding to at least one of said oxides, said process being further characterized in that the temperature in said reaction zone is maintained at least in part by heat from a radio-frequency induced plasma, said reaction zone being defined by (a) a reactant mixing zone, (b) a product withdrawal zone and (c) a fluid-impermeable containing means between said reactant mixing zone and said product withdrawal zone, the improvement which comprises:

(i) positioning a fluid permeable barrier within said reaction zone in spaced relation to said containing means (c) to define a chamber therebetween said barrier and associated chamber being in general surrounding relation to the reactants and reaction products contained in said reaction zone while premitting the substantially unimpeded flow of materials through said reaction zone from said reactant mixing zone (a) and to said product withdrawal zone (b);

(ii) positioning the radio-frequency induction means for producing said radio-frequency induced plasma between said fluid-impermeable containing means (c) and said fluid-permeable barrier;

(iii) producing said radio-frequency induced plasma within said reaction zone;

(iv) introducing into said chamber a fluid characterized as gaseous at the conditions in said reaction zone and as compatible with the oxidation reaction and the products thereof;

(v) raising the pressure of said fluid in said chamber to a value exceeding the pressure within said reaction zone; and (vi) transpiring said fluid through said fluid-permeable barrier into said reaction zone.

2. In the production of an oxide selected from the group consisting of metal oxides and metalloid oxides by a process comprising the vapor phase relation in a reaction zone of an oxygenating gas with a halide corresponding to at least one of said oxides, said process being further characterized in that the temperature in said reaction zone is maintained at least in part by heat from a radio-frequency induced plasma, said reaction zone being defined by (a) a reactant mixing zone, (b) a product withdrawal zone and (c) a fluid-impermeable containing means between said reactant mixing zone and said product withdrawal zone, the improvement which comprises:

(i) positioning a fluid-permeable barrier within said reaction zone in space relation to said containing means (c) to define a chamber therebetween, said barrier and associated chamber being in general surrounding relation to the reactants and reaction products contained in said reaction zone while permitting the substantially unimpeded flow of materials through said reaction zone from the reactant mixing zone (a) and to said product withdrawal zone (b);

(ii) introducing at least one of the said gaseous reactants into the reaction zone with a helical flow into heat exchange contact with said plasma;

(iii) introducing into said chamber a fluid characterized as gaseous at the conditions in said reaction zone and as compatible with the oxidation reaction and the products thereof;

(iv) raising the pressure of said fluid in said chamber to a value exceeding the pressure within said reaction zone; and (v) transpiring said fluid through said fluid-permeable barrier into said reaction zone.

3. An apparatus suitable for the production of metal and metalloid oxides by the vapor phase oxidation of a corresponding halide comprising in combination:

(a) a reactor comprising an outer fluid-impermeable wall and an inner fluid-permeable wall in spaced relation to said outer wall, said inner wall defining a reaction zone from said outer wall;

(b) an induction coil in operable association with said reactor adapted for the conversion to a radio-frequency induced plasma of a gas introduced therein;

(c) means for feeding a gas into the field of said induction coil (b) for the establishment of a plasma and for effecting heating by such plasma of a gas introduced into said reaction zone;

(d) reactor feeding means adapted for introducing gases including an oxygenating gas and said halide into said reaction zone in said reactor;

(e) means for introducing fluid into the space between said inner and outer walls of reactor (a) and for effecting transpiration of said fluid through said fluid-permeable inner wall; and (f) means for withdrawing reaction products from said reaction zone in said reactor.

4. An apparatus in accordance with claim 3 wherein said fluid-permeable wall comprises fritted silica.

5. The apparatus of claim 3 wherein said fluid-permeable wall is of substantially uniform porosity, said fluid-permeable wall providing sufficient resistance to transpiration to provide a substantial pressure drop across the wall during transpiration.

6. An apparatus in accordance with claim 3 including means for cooling reaction products withdrawn from said reaction zone and means for separating and collecting oxide solids in said reaction products from effluent gases.

7. The apparatus of claim 3 in which the induction coil is formed as a single layer solenoid.

8. The apparatus of claim 7 in which said induction coil is formed with a reverse turn at its upstream end.

9. The apparatus of claim 7 in which said induction coil is formed with a reverse turn at its downstream end.

10. An apparatus in accordance with claim 3, wherein said induction coil (b) is positioned outside of said reactor and separate from said reaction zone.

11. An apparatus in accordance with claim 3 in which said induction coil is positioned between said inner and outer walls of said reactor in generally surrounding relation to said reaction zone.

12. An apparatus in accordance with claim 11 wherein said induction coil is enclosed within a corrosion-shielding material.

13. An apparatus in accordance with claim 3 wherein said means for effecting heating of gas by an established plasma comprises a tangential injecting means for said gas adapted to impart thereto a helical flow and to effect contact between said gas and said plasma.

14. An apparatus in accordance with claim 3 wherein said means for effecting heating of gas by an established plasma comprises an axially oriented injecting means for said gas adapted to impart thereto an axial sheath flow and to effect contact between said gas and said plasma.

References Cited

UNITED STATES PATENTS

| | | |
|---|---|---|
| 2,670,275 | 2/1954 | Olson et al. |
| 2,750,260 | 1/1956 | Nelson et al. |
| 2,945,797 | 7/1960 | Cherrier _____ 204—164 |
| 3,203,763 | 8/1965 | Kruse. |
| 3,257,196 | 6/1966 | Foex _____ 23—277 XR |
| 3,275,411 | 9/1966 | Freeman. |
| 3,337,438 | 8/1967 | Gobeli et al. _____ 204—164 |

FOREIGN PATENTS

| | |
|---|---|
| 2,357 | Republic of South Africa. |
| 1,183,482 | Germany. |

EDWARD STERN, *Primary Examiner.*

U.S. Cl. X.R.

23—140, 142, 182, 202, 277; 204—164